United States Patent
Annaka et al.

(10) Patent No.: US 10,985,375 B2
(45) Date of Patent: Apr. 20, 2021

(54) SLURRY COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Koji Annaka, Tokyo (JP); Takuya Ishii, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 108 days.

(21) Appl. No.: 16/331,669

(22) PCT Filed: Sep. 8, 2017

(86) PCT No.: PCT/JP2017/032541
§ 371 (c)(1),
(2) Date: Mar. 8, 2019

(87) PCT Pub. No.: WO2018/056083
PCT Pub. Date: Mar. 29, 2018

(65) Prior Publication Data
US 2019/0198878 A1 Jun. 27, 2019

(30) Foreign Application Priority Data

Sep. 20, 2016 (JP) .............................. JP2016-183083

(51) Int. Cl.
| | | |
|---|---|---|
| *H01M 4/13* | (2010.01) | |
| *H01M 4/62* | (2006.01) | |
| *H01M 4/525* | (2010.01) | |
| *H01M 4/505* | (2010.01) | |
| *H01M 10/0525* | (2010.01) | |
| *C08F 220/48* | (2006.01) | |
| *C08K 3/04* | (2006.01) | |
| *C08K 7/06* | (2006.01) | |
| *C08K 3/22* | (2006.01) | |
| *C08F 2/20* | (2006.01) | |
| *H01M 10/0566* | (2010.01) | |
| *H01M 4/1391* | (2010.01) | |
| *H01M 4/131* | (2010.01) | |
| *C08F 2/22* | (2006.01) | |
| *H01M 4/02* | (2006.01) | |

(52) U.S. Cl.
CPC .............. *H01M 4/622* (2013.01); *C08F 2/20* (2013.01); *C08F 2/22* (2013.01); *C08F 220/48* (2013.01); *C08K 3/04* (2013.01); *C08K 3/22* (2013.01); *C08K 7/06* (2013.01); *H01M 4/131* (2013.01); *H01M 4/1391* (2013.01); *H01M 4/505* (2013.01); *H01M 4/525* (2013.01); *H01M 4/62* (2013.01); *H01M 4/625* (2013.01); *H01M 10/0525* (2013.01); *H01M 10/0566* (2013.01); *C08F 2800/20* (2013.01); *C08K 2003/2293* (2013.01); *C08K 2201/001* (2013.01); *H01M 2004/028* (2013.01)

(58) Field of Classification Search
CPC .... H01M 4/622; H01M 4/131; H01M 4/1391; H01M 4/505; H01M 4/525; H01M 4/62; H01M 4/625; H01M 10/0525; H01M 10/0566; H01M 2004/028; C08F 2/20; C08F 2/22; C08F 220/48; C08F 800/20; C08K 3/04; C08K 3/22; C08K 7/06; C08K 2003/2293; C08K 2201/001
See application file for complete search history.

(56) References Cited

U.S. PATENT DOCUMENTS

| | | | |
|---|---|---|---|
| 2011/0003207 A1 | 1/2011 | Oh et al. | |
| 2013/0122364 A1* | 5/2013 | Kim .................... | H01M 4/622 429/211 |
| 2013/0330622 A1 | 12/2013 | Sasaki | |
| 2015/0072244 A1* | 3/2015 | Chen .................. | H01M 10/0565 429/303 |
| 2015/0357648 A1* | 12/2015 | Sugimoto ............. | H01M 4/622 429/217 |
| 2017/0084923 A1 | 3/2017 | Oh et al. | |

FOREIGN PATENT DOCUMENTS

| | | |
|---|---|---|
| JP | 2011513911 A | 4/2011 |
| JP | 2012204303 A | 10/2012 |
| WO | 2012115096 A1 | 8/2012 |
| WO | 2015151525 A1 | 10/2015 |

OTHER PUBLICATIONS

Mar. 26, 2019, International Preliminary Report on Patentability issued in the International Patent Application No. PCT/JP2017/032541.
Jan. 27, 2020, The Extended European Search Report issued by the European Patent Office in the corresponding European Patent Application No. 17852860.0.

* cited by examiner

*Primary Examiner* — Raymond Alejandro
(74) *Attorney, Agent, or Firm* — Kenja IP Law PC

(57) ABSTRACT

Provided is a slurry composition for a non-aqueous secondary battery positive electrode that has excellent stability and enables formation of a positive electrode mixed material layer that causes a non-aqueous secondary battery to display excellent output characteristics. The slurry composition contains a positive electrode active material and a copolymer. The proportion constituted by nickel among transition metal in the positive electrode active material is at least 30.0 mol % and not more than 100.0 mol %. The copolymer includes a nitrile group-containing monomer unit in a proportion of at least 70.0 mass % and not more than 96.0 mass % and a basic group-containing monomer unit in a proportion of at least 0.1 mass % and not more than 5.0 mass %.

9 Claims, No Drawings

SLURRY COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

TECHNICAL FIELD

The present disclosure relates to a slurry composition for a non-aqueous secondary battery positive electrode, a positive electrode for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications.

A positive electrode for a lithium ion secondary battery, for example, normally includes a current collector and a positive electrode mixed material layer formed on the current collector. This positive electrode mixed material layer is formed by, for example, applying a slurry composition containing a positive electrode active material and a binder onto the current collector, and then drying the applied slurry composition.

In recent years, attempts have been made to improve binders used in the formation of positive electrode mixed material layers in order to further improve secondary battery performance.

For example, PTL 1 discloses the use of a polyacrylonitrile-acrylic acid copolymer having a molar ratio of acrylic acid relative to acrylonitrile within a range of 0.01 to 2 as a binder. According to PTL 1, this polyacrylonitrile-acrylic acid copolymer has excellent adhesion strength and electrolyte solution resistance.

CITATION LIST

Patent literature

PTL 1: JP 2011-513911 A

SUMMARY

Technical Problem

There is demand for further increasing the capacity of lithium ion secondary batteries and other secondary batteries. For this reason, techniques aimed at increasing the capacity of lithium ion secondary batteries through the use of compounds containing nickel (Ni) as positive electrode active materials have been proposed in recent years.

However, alkali content of lithium carbonate ($Li_2CO_3$), lithium hydroxide (LiOH), or the like used in production of a nickel-containing positive electrode active material (hereinafter, also referred to as a "Ni-containing positive electrode active material") remains in the positive electrode active material. An increase in pH due to this alkali content is thought to cause thickening over time of a slurry composition obtained through mixing of a Ni-containing positive electrode active material and the binder in the conventional technique described above. Moreover, a positive electrode mixed material layer obtained using such a slurry composition suffers from a problem in terms of not being able to cause a non-aqueous secondary battery to display excellent output characteristics.

In other words, there is room for improvement in the conventional technique described above in terms of ensuring sufficient slurry composition stability and causing a non-aqueous secondary battery to display excellent output characteristics even in a case in which a Ni-containing positive electrode active material is used.

Accordingly, an objective of the present disclosure is to provide a slurry composition for a non-aqueous secondary battery positive electrode that has excellent stability and enables formation of a positive electrode mixed material layer that causes a non-aqueous secondary battery to display excellent output characteristics.

Another objective of the present disclosure is to provide a positive electrode for a non-aqueous secondary battery that causes a non-aqueous secondary battery to display excellent output characteristics.

Yet another objective of the present disclosure is to provide a non-aqueous secondary battery having excellent output characteristics.

Solution to Problem

The inventors conducted diligent investigation with the aim of solving the problems set forth above. Through this investigation, the inventors discovered that a slurry composition containing a positive electrode active material in which the proportion constituted by nickel among transition metal is within a specific range and a copolymer including a nitrile group-containing monomer unit and a basic group-containing monomer unit with specific percentage contents has excellent stability and can be used to form a positive electrode mixed material layer that can enhance battery characteristics such as output characteristics of a secondary battery. In this manner, the inventors completed the present disclosure.

Specifically, the present disclosure aims to advantageously solve the problem set forth above by disclosing a slurry composition for a non-aqueous secondary battery positive electrode comprising a positive electrode active material and a copolymer, wherein a proportion constituted by nickel among transition metal in the positive electrode active material is at least 30.0 mol % and not more than 100.0 mol %, and the copolymer includes a nitrile group-containing monomer unit and a basic group-containing monomer unit, percentage content of the nitrile group-containing monomer unit in the copolymer is at least 70.0 mass % and not more than 96.0 mass %, and percentage content of the basic group-containing monomer unit in the copolymer is at least 0.1 mass % and not more than 5.0 mass %.

A slurry composition containing a positive electrode active material in which the proportion constituted by nickel among transition metal is within the range set forth above and a copolymer having the chemical composition set forth above has excellent stability and can be used to form a positive electrode mixed material layer that causes a secondary battery to display excellent output characteristics.

The "proportion constituted by nickel among transition metal in a positive electrode active material" referred to in the present disclosure can be measured by a method described in the EXAMPLES section of the present specification using ICP atomic emission spectroscopy (ICP-AES). Moreover, the phrase "including a monomer unit" as used in the present disclosure means that "a polymer obtained using that monomer includes a repeating unit derived from the monomer". Moreover, in a polymer produced through copolymerization of a plurality of monomers, the "percentage content of a monomer unit" that is formed through polymerization of a given monomer is normally the same as the ratio (charging ratio) of the given monomer among all monomers used in polymerization of the polymer. The "percentage content" of each "monomer unit" in a polymer can be measured by a nuclear magnetic resonance (NMR) method such as $^1$H-NMR or $^{13}$C-NMR.

In the presently disclosed slurry composition for a non-aqueous secondary battery positive electrode, it is preferable that the copolymer further includes an acidic group-containing monomer unit, and percentage content of the acidic group-containing monomer unit in the copolymer is at least 0.1 mass % and not more than 10.0 mass %. A positive electrode can be provided with an appropriate degree of flexibility and peel strength of the positive electrode (close adhesion strength between a positive electrode mixed material layer and a current collector) can be increased when the copolymer includes an acidic group-containing monomer unit in the proportion set forth above. In addition, secondary battery output characteristics can be further improved while also enhancing secondary battery cycle characteristics.

In the presently disclosed slurry composition for a non-aqueous secondary battery positive electrode, it is preferable that the copolymer further includes a (meth)acrylic acid ester monomer unit, and percentage content of the (meth)acrylic acid ester monomer unit in the copolymer is at least 1.0 mass % and not more than 20.0 mass %. A positive electrode can be provided with an appropriate degree of flexibility and peel strength of the positive electrode can be increased when the copolymer includes a (meth)acrylic acid ester monomer unit in the proportion set forth above. In addition, secondary battery output characteristics can be further improved while also enhancing secondary battery cycle characteristics.

In the present disclosure, "(meth)acryl" is used to indicate "acryl" and/or "methacryl".

In the presently disclosed slurry composition for a non-aqueous secondary battery positive electrode, the basic group-containing monomer unit is preferably an amide group-containing monomer unit. Stability of the slurry composition can be further increased and positive electrode peel strength can be improved when the copolymer includes an amide group-containing monomer unit as the basic group-containing monomer unit. In addition, secondary battery output characteristics can be further improved while also enhancing secondary battery cycle characteristics.

In the presently disclosed slurry composition for a non-aqueous secondary battery positive electrode, the positive electrode active material is preferably a lithium-containing composite metal oxide represented by a formula (A1): $LiNi_aCo_bMn_cO_2$, where $0.3 \leq a \leq 1.0$, $0 \leq b \leq 0.5$, $0 \leq c \leq 0.5$, and $0.9 \leq a+b+c \leq 1.1$, or a formula (A2): $LiNi_xCo_yAl_zO_2$, where $0.7 \leq x \leq 1.0$, $0 \leq y \leq 0.3$, $0 \leq z \leq 0.1$, and $0.9 \leq x+y+z \leq 1.1$. A lithium-containing composite metal oxide represented by either of the formulae presented above does not readily deteriorate and has excellent capacity per unit volume. Therefore, secondary battery cycle characteristics can be enhanced and secondary battery output characteristics can be further improved by using the lithium-containing composite metal oxide set forth above as the positive electrode active material.

It is preferable that the presently disclosed slurry composition for a non-aqueous secondary battery positive electrode further comprises a conductive material, and that the conductive material includes conductive carbon fiber. The inclusion of conductive carbon fiber as a conductive material in the slurry composition enables favorable conduction path formation in a positive electrode mixed material layer and further improvement of secondary battery output characteristics.

In the presently disclosed slurry composition for a non-aqueous secondary battery positive electrode, the copolymer preferably has a weight-average molecular weight of at least 100,000 and not more than 1,500,000. Positive electrode peel strength can be increased and secondary battery cycle characteristics can be improved when a copolymer having a weight-average molecular weight within the range set forth above is used.

The "weight-average molecular weight" of a copolymer referred to in the present disclosure can be measured by a method described in the EXAMPLES section of the present specification using gel permeation chromatography (GPC).

Moreover, the present disclosure aims to advantageously solve the problem set forth above by disclosing a positive electrode for a non-aqueous secondary battery comprising a positive electrode mixed material layer formed using any one of the slurry compositions for a non-aqueous secondary battery positive electrode set forth above. A positive electrode for a non-aqueous secondary battery that causes a secondary battery to display excellent output characteristics can be obtained when the slurry composition for a non-aqueous secondary battery positive electrode set forth above is used in this manner.

In the presently disclosed positive electrode for a non-aqueous secondary battery, the positive electrode mixed material layer preferably has a density of at least 2.5 g/cm$^3$ and not more than 3.8 g/cm$^3$. A secondary battery obtained using a positive electrode including a positive electrode mixed material layer having a density within the range set forth above has high energy density. Moreover, positive electrode peel strength can be increased and secondary battery cycle characteristics can be improved by setting the density of the positive electrode mixed material layer within the range set forth above.

The "density" of a positive electrode mixed material layer referred to in the present disclosure can be calculated using the mass per unit area of the positive electrode mixed material layer and the thickness of the positive electrode mixed material layer.

Furthermore, the present disclosure aims to advantageously solve the problem set forth above by disclosing a non-aqueous secondary battery comprising a positive electrode, a negative electrode, an electrolyte solution, and a separator, wherein the positive electrode is any one of the positive electrodes for a non-aqueous secondary battery set forth above. A secondary battery having excellent battery characteristics such as output characteristics is obtained when any one of the positive electrodes for a non-aqueous secondary battery set forth above is used in this manner.

Advantageous Effect

According to the present disclosure, it is possible to provide a slurry composition for a non-aqueous secondary battery positive electrode that has excellent stability and enables formation of a positive electrode mixed material layer that causes a non-aqueous secondary battery to display excellent output characteristics.

Moreover, according to the present disclosure, it is possible to provide a positive electrode for a non-aqueous secondary battery that causes a non-aqueous secondary battery to display excellent output characteristics.

Furthermore, according to the present disclosure, it is possible to provide a non-aqueous secondary battery having excellent output characteristics.

DETAILED DESCRIPTION

The following provides a detailed description of embodiments of the present disclosure.

The presently disclosed slurry composition for a non-aqueous secondary battery positive electrode can be used in production of a positive electrode of a non-aqueous secondary battery such as a lithium ion secondary battery. Moreover, the presently disclosed positive electrode for a non-aqueous secondary battery can be produced using the presently disclosed slurry composition for a non-aqueous secondary battery positive electrode. Furthermore, the presently disclosed non-aqueous secondary battery includes the presently disclosed positive electrode for a non-aqueous secondary battery formed using the presently disclosed slurry composition for a non-aqueous secondary battery positive electrode.

(Slurry Composition for Non-Aqueous Secondary Battery Positive Electrode)

The presently disclosed slurry composition for a non-aqueous secondary battery positive electrode contains a positive electrode active material and a copolymer in a solvent, and may optionally further contain a conductive material and other components that can be contained in positive electrodes of non-aqueous secondary batteries. The positive electrode active material in the presently disclosed slurry composition is a Ni-containing positive electrode active material that contains transition metal and contains nickel in a proportion of at least 30.0 mol % and not more than 100.0 mol % among the transition metal. The copolymer in the presently disclosed slurry composition is a copolymer that includes a nitrile group-containing monomer unit with a percentage content of at least 70.0 mass % and not more than 96.0 mass % and a basic group-containing monomer unit with a percentage content of at least 0.1 mass % and not more than 5.0 mass %.

As a result of the presently disclosed slurry composition containing the aforementioned Ni-containing positive electrode active material as a positive electrode active material, the presently disclosed slurry composition can be used to form a positive electrode mixed material layer that can increase the capacity of a non-aqueous secondary battery. Moreover, as a result of the presently disclosed slurry composition containing the aforementioned copolymer as a binder, a secondary battery can be caused to display excellent output characteristics and sufficient stability of the slurry composition can be ensured even when a Ni-containing positive electrode active material is used.

Although it is not clear why a secondary battery can be caused to display excellent output characteristics while also increasing the stability of a slurry composition containing a Ni-containing positive electrode active material through use of the aforementioned copolymer as a binder, the reason is presumed to be as follows. Specifically, the copolymer contained in the presently disclosed slurry composition has excellent binding capacity and contributes to improving battery characteristics such as output characteristics of a secondary battery as a result of including a nitrile group-containing monomer unit with a high percentage content. On the other hand, a copolymer containing a nitrile group-containing monomer unit with a high percentage content (i.e., a high-nitrile copolymer) has poor polymerization stability, and a large amount of oligomer having a relatively low degree of polymerization is contained in the high-nitrile copolymer obtained after polymerization reaction. The presence of such oligomer is presumed to result in a slurry composition that contains a high-nitrile copolymer having a high tendency to become non-uniform and also having a high tendency to become unstable, particularly under the influence of residual alkali content in a case in which a Ni-containing positive electrode active material is used. However, when a nitrile group-containing monomer and a basic group-containing monomer are copolymerized in production of a high-nitrile copolymer, the basic group-containing monomer contributes to ensuring polymerization stability and suppressing production of the above-described oligomer. For this reason, the presently disclosed slurry composition is thought to be resistant to thickening over time and have excellent stability even in a situation in which residual alkali content of the Ni-containing positive electrode active material causes a high pH.

<Positive Electrode Active Material>

The positive electrode active material is a material that accepts and donates electrons in the positive electrode of a secondary battery. A Ni-containing positive electrode active material is used as the positive electrode active material in the presently disclosed slurry composition.

When the total amount of transition metal contained in the Ni-containing positive electrode active material is taken to be 100.0 mol %, the proportion of nickel is required to be at least 30.0 mol % and not more than 100.0 mol %, is preferably 40.0 mol % or more, and is preferably 90.0 mol % or less. The capacity per unit volume decreases and secondary battery output characteristics deteriorate if the proportion constituted by nickel among transition metal in the Ni-containing positive electrode active material falls below the lower limit set forth above. On the other hand, the Ni-containing positive electrode active material does not readily deteriorate when the proportion constituted by nickel among transition metal in the Ni-containing positive electrode active material is not more than the upper limit set forth above.

Examples of transition metals other than nickel that may be contained in the Ni-containing positive electrode active material include cobalt (Co), manganese (Mn), iron (Fe), and titanium (Ti).

In the case of a secondary battery that is a lithium ion secondary battery, for example, a lithium-containing composite metal oxide represented by a formula (A1): $LiNi_aCo_bMn_cO_2$ and a lithium-containing composite metal oxide represented by a formula (A2): $LiNi_xCo_yAl_zO_2$ can suitably be used as the Ni-containing positive electrode active material. These lithium-containing composite metal oxides do not readily deteriorate and have excellent capacity per unit volume. Consequently, secondary battery cycle characteristics can be enhanced and secondary battery output characteristics can be further improved by using such a lithium-containing composite metal oxide as the positive electrode active material.

Note that in the preceding formula (A1), a is at least 0.3 and not more than 1.0, is preferably 0.35 or more, and more preferably 0.4 or more, and is preferably 0.8 or less, and more preferably 0.7 or less. Moreover, b is at least 0 and not more than 0.5, is preferably 0.1 or more, and is preferably 0.3 or less. Furthermore, c is at least 0 and not more than 0.5, is preferably 0.2 or more, and is preferably 0.4 or less. The total of a, b, and c (a+b+c) is at least 0.9 and not more than 1.1.

In the preceding formula (A2), x is at least 0.7 and not more than 1.0, and is preferably 0.9 or less. Moreover, y is at least 0 and not more than 0.3, is preferably 0.1 or more, and is preferably 0.2 or less. Furthermore, z is at least 0 and not more than 0.1. The total of x, y, and z (x+y+z) is at least 0.9 and not more than 1.1.

The amount and particle diameter of the positive electrode active material are not specifically limited and may be the same as those of conventionally-used positive electrode active materials.

<Copolymer>

In a positive electrode produced by forming a positive electrode mixed material layer using the slurry composition, the copolymer holds components contained in the positive electrode mixed material layer such that these components do not become detached from the positive electrode mixed material layer (i.e., functions as a binder).

[Chemical Composition of Copolymer]

The copolymer includes a nitrile group-containing monomer unit and a basic group-containing monomer unit, and may optionally include other monomer units. Examples of monomer units other than the nitrile group-containing monomer unit and the basic group-containing monomer unit include, but are not specifically limited to, an acidic group-containing monomer unit and a (meth)acrylic acid ester monomer unit.

Nitrile Group-Containing Monomer Unit

Examples of nitrile group-containing monomers that can be used to form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these nitrile group-containing monomers, acrylonitrile and methacrylonitrile are preferable.

One of these nitrile group-containing monomers may be used individually, or two or more of these nitrile group-containing monomers may be used in combination.

The proportion in which the nitrile group-containing monomer unit is included in the copolymer when all repeating units in the copolymer are taken to be 100 mass % is required to be at least 70.0 mass % and not more than 96.0 mass %, is preferably 80.0 mass % or more, and more preferably 85.0 mass % or more, and is preferably 95.5 mass % or less, and more preferably 95.0 mass % or less. Positive electrode flexibility is lost and positive electrode peel strength decreases if the percentage content of the nitrile group-containing monomer unit in the copolymer exceeds the upper limit set forth above. On the other hand, binding capacity of the copolymer is lost, positive electrode peel strength cannot be ensured, and secondary battery output characteristics and cycle characteristics deteriorate if the percentage content of the nitrile group-containing monomer unit in the copolymer falls below the lower limit set forth above.

Basic Group-Containing Monomer Unit

Examples of basic group-containing monomers that can be used to form the basic group-containing monomer unit include monomers having a nitrogen-containing functional group (excluding the nitrile group-containing monomers described above) such as amino group-containing monomers and amide group-containing monomers. The basic group-containing monomer may be in the form of a salt including a chloride ion or the like. Herein, a monomer having both an amide group and an amino group is considered to be included among amide group-containing monomers.

Examples of amino group-containing monomers include dimethylaminoethyl (meth)acrylate, diethylaminoethyl (meth)acrylate, aminoethyl vinyl ether, and dimethylaminoethyl vinyl ether. In the present disclosure, "(meth)acrylate" is used to indicate "acrylate" and/or "methacrylate".

Examples of amide group-containing monomers include N-vinylacetamide, (meth)acrylamide, N-methylol(meth)acrylamide, dimethyl(meth)acrylamide, diethyl(meth)acrylamide, hydroxyethyl(meth)acrylamide, N-methoxymethyl (meth)acrylamide, and dimethylaminopropyl(meth)acrylamide.

Of these examples, amide group-containing monomers are preferable, and acrylamide, diethylacrylamide, and N-methylol(meth)acrylamide are more preferable from a viewpoint of further enhancing slurry composition stability and secondary battery cycle characteristics and improving positive electrode peel strength and secondary battery cycle characteristics. Acrylamide is even more preferable from a viewpoint of further improving positive electrode peel strength and slurry composition stability.

One basic group-containing monomer may be used individually, or two or more basic group-containing monomers may be used in combination in a freely selected ratio.

The proportion in which the basic group-containing monomer unit is included in the copolymer when all repeating units in the copolymer are taken to be 100 mass % is required to be at least 0.1 mass % and not more than 5.0 mass %, is preferably 0.3 mass % or more, and more preferably 0.5 mass % or more, and is preferably 3.0 mass % or less, and more preferably 1.5 mass % or less. Positive electrode peel strength and secondary battery cycle characteristics deteriorate if the percentage content of the basic group-containing monomer unit in the copolymer exceeds the upper limit set forth above. On the other hand, polymerization stability of the copolymer decreases and stability of the slurry composition is lost if the percentage content of the basic group-containing monomer unit in the copolymer falls below the lower limit set forth above.

Acidic Group-Containing Monomer Unit

Examples of acidic group-containing monomers that can be used to form the acidic group-containing monomer unit include carboxy group-containing monomers, sulfo group-containing monomers, and phosphate group-containing monomers. Positive electrode peel strength can be increased and secondary battery cycle characteristics can be improved by using such monomers as acidic group-containing monomers. Note that the acidic group-containing monomer may be in the form of a salt such as a sodium salt or a lithium salt.

Examples of carboxy group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid.

Examples of monocarboxylic acid derivatives include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of dicarboxylic acid derivatives include methylmaleic acid, dimethylmaleic acid, phenylmaleic acid, chloromaleic acid, dichloromaleic acid, fluoromaleic acid, and monoesters of maleic acid such as nonyl maleate, decyl maleate, dodecyl maleate, octadecyl maleate, and fluoroalkyl maleate.

Examples of acid anhydrides of dicarboxylic acids include maleic anhydride, acrylic anhydride, methyl maleic anhydride, and dimethyl maleic anhydride.

Furthermore, an acid anhydride that produces a carboxy group upon hydrolysis can also be used as a carboxy group-containing monomer.

Examples of sulfo group-containing monomers include styrene sulfonic acid, vinyl sulfonic acid, methyl vinyl sulfonic acid, (meth)allyl sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Carboxy group-containing monomers are preferable, (meth)acrylic acid and itaconic acid are more preferable, and (meth)acrylic acid is even more preferable as the acidic group-containing monomer from a viewpoint of increasing polymerization stability of the copolymer, further improving slurry composition stability, and improving positive electrode peel strength.

One acidic group-containing monomer may be used individually, or two or more acidic group-containing monomers may be used in combination in a freely selected ratio.

The proportion in which the acidic group-containing monomer unit is included in the copolymer when all repeating units in the copolymer are taken to be 100 mass % is preferably 0.1 mass % or more, more preferably 0.5 mass % or more, and even more preferably 1.0 mass % or more, and is preferably 10.0 mass % or less, more preferably 5.0 mass % or less, and even more preferably 3.0 mass % or less. When the percentage content of the acidic group-containing monomer unit in the copolymer is not more than any of the upper limits set forth above, positive electrode flexibility can be ensured, positive electrode peel strength and secondary battery cycle characteristics can be enhanced, and secondary battery output characteristics can be further improved. On the other hand, when the percentage content of the acidic group-containing monomer unit in the copolymer is at least any of the lower limits set forth above, binding capacity of the copolymer can be ensured, and positive electrode peel strength can be improved.

(Meth)Acrylic Acid Ester Monomer Unit

Examples of (meth)acrylic acid ester monomers that can be used to form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate (for example, 2-ethylhexyl acrylate), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate (for example, 2-ethylhexyl methacrylate), nonyl methacrylate, decyl methacrylate, lauryl methacrylate, n-tetradecyl methacrylate, and stearyl methacrylate.

Of these (meth)acrylic acid ester monomers, n-butyl acrylate and 2-ethylhexyl acrylate are preferable from a viewpoint of ensuring reactivity and polymerization stability in production of the copolymer, further improving slurry composition stability, and providing a positive electrode with flexibility. One (meth)acrylic acid ester monomer may be used individually, or two or more (meth)acrylic acid ester monomers may be used in combination in a freely selected ratio.

The proportion in which the (meth)acrylic acid ester monomer unit is included in the copolymer when all repeating units in the copolymer are taken to be 100 mass % is preferably 1.0 mass % or more, and more preferably 3.0 mass % or more, and is preferably 20.0 mass % or less, more preferably 10.0 mass % or less, and even more preferably 5.0 mass % or less. When the percentage content of the (meth)acrylic acid ester monomer unit in the copolymer is not more than any of the upper limits set forth above, binding capacity of the copolymer can be ensured, and secondary battery cycle characteristics can be improved. On the other hand, when the percentage content of the (meth)acrylic acid ester monomer unit in the copolymer is at least any of the lower limits set forth above, positive electrode flexibility increases, and positive electrode peel strength improves.

[Production of Copolymer]

The copolymer can be produced, for example, through polymerization, in an aqueous solvent, of a monomer composition that contains the monomers set forth above. In the present disclosure, the percentage content of each of the monomers in the monomer composition can be set in accordance with the percentage content of each of the monomer units (repeating units) in the copolymer.

The aqueous solvent is not specifically limited so long as the copolymer can be dispersed therein, and may be water used individually or a mixed solvent of water and another solvent.

The mode of polymerization is not specifically limited and may, for example, be solution polymerization, suspension polymerization, bulk polymerization, or emulsion polymerization. The polymerization method may, for example, be ionic polymerization, radical polymerization, living radical polymerization, or the like.

Commonly used emulsifiers, dispersants, polymerization initiators, polymerization aids, and the like may be used in the polymerization in an amount that is also the same as commonly used.

The copolymer obtained through polymerization in an aqueous solvent can be used in production of the presently disclosed slurry composition as a binder composition obtained by replacing the aqueous solvent with an organic solvent as necessary.

[Properties of Copolymer]

The weight-average molecular weight of the copolymer is preferably 100,000 or more, more preferably 300,000 or more, even more preferably 500,000 or more, and particularly preferably 800,000 or more, and is preferably 1,500,000 or less. When the weight-average molecular weight of the copolymer is not more than the upper limit set forth above, a smooth positive electrode mixed material layer can be obtained because coatability of the slurry composition is ensured, and positive electrode peel strength can be improved. On the other hand, when the weight-average molecular weight of the copolymer is at least any of the lower limits set forth above, binding capacity of the copolymer can be ensured, and positive electrode peel strength and secondary battery cycle characteristics can be improved.

The molecular weight distribution (Mw/Mn) of the copolymer is preferably at least 1.0 and not more than 10.0, and more preferably at least 1.0 and not more than 6.0. Stability of the slurry composition can be further improved when the molecular weight distribution of the copolymer is within any of the ranges set forth above. The term "molecular weight distribution" as used in the present disclosure refers to the ratio of weight-average molecular weight (Mw) relative to number-average molecular weight (Mn). Moreover, the "number-average molecular weight" referred to in the present disclosure can be measured by a method described in the EXAMPLES section of the present specification using gel permeation chromatography (GPC) in the same way as the "weight-average molecular weight".

[Amount of Copolymer]

The proportion in which the copolymer is contained in the slurry composition per 100 parts by mass of the positive electrode active material is preferably 0.3 parts by mass or more, and more preferably 1.0 parts by mass or more, and is preferably 5.0 parts by mass or less, and more preferably 4.0 parts by mass or less. Secondary battery internal resistance can be lowered and secondary battery output characteristics can be ensured when the amount of the copolymer in the slurry composition is not more than any of the upper limits set forth above, whereas positive electrode peel strength can be improved when the amount of the copolymer in the slurry composition is at least any of the lower limits set forth above.

<Solvent>

Although no specific limitations are placed on the solvent contained in the slurry composition, the solvent is preferably an organic solvent. Examples of organic solvents that may be used include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide-based polar organic solvents such as N,N-dimethylformamide, N,N-dimethylacetamide, and N-methylpyrrolidone (NMP); N,N-dimethyl sulfoxide; and aromatic hydrocarbons such as toluene, xylene, chlorobenzene, orthodichlorobenzene, and paradichlorobenzene. One of these solvents may be used individually, or two or more of these solvents may be used as a mixture. Of these solvents, polar aprotic solvents such as ketones, esters, amide-based polar organic solvents, and N,N-dimethyl sulfoxide are preferable, and NMP is particularly preferable.

<Conductive Material>

A conductive material that is optionally contained in the presently disclosed slurry composition is used in order to ensure electrical contact amongst the positive electrode active material in a positive electrode mixed material layer. Examples of conductive materials that may be used include conductive carbon materials and fibers and foils of various metals, with conductive carbon materials being preferable.

Examples of conductive carbon materials that may be used include carbon black (for example, acetylene black, Ketjenblack® (Ketjenblack is a registered trademark in Japan, other countries, or both), and furnace black); single layer or multilayer graphene; carbon nonwoven sheet obtained through firing of nonwoven fabric made from polymer fiber; and conductive carbon fiber such as single-walled or multi-walled carbon nanotubes (multi-walled carbon nanotubes are inclusive of cup-stacked carbon nanotubes), carbon nanohorns, vapor-grown carbon fiber, and milled carbon fiber obtained by firing and then pulverizing polymer fiber.

One of these conductive materials may be used individually, or two or more of these conductive materials may be used in combination.

The presently disclosed slurry composition preferably contains at least conductive carbon fiber as a conductive material, and preferably includes both conductive carbon fiber and carbon black as conductive materials from a viewpoint of favorable conduction path formation in a positive electrode mixed material layer and further improvement of secondary battery output characteristics.

The proportion in which the conductive material is contained in the slurry composition per 100 parts by mass of the positive electrode active material is preferably 0.1 parts by mass or more, and more preferably 0.5 parts by mass or more, and is preferably 10 parts by mass or less, and more preferably 5 parts by mass or less. When the amount of the conductive material in the slurry composition is not more than any of the upper limits set forth above, the copolymer serving as a binder is not excessively covered by the conductive material, and positive electrode peel strength can be ensured. On the other hand, when the amount of the conductive material in the slurry composition is at least any of the lower limits set forth above, a conduction path can favorably be formed in a positive electrode mixed material layer, and secondary battery output characteristics can be further improved.

In a case in which the presently disclosed slurry composition contains both conductive carbon fiber and carbon black, the proportion constituted by the conductive carbon fiber among the total amount of the conductive carbon fiber and the carbon black when the total amount of the conductive carbon fiber and the carbon black is taken to be 100 mass % is preferably 1.0 mass % or more, and is preferably 50.0 mass % or less, and more preferably 30.0 mass % or less. When the proportion constituted by the conductive carbon fiber among the total amount of the conductive carbon fiber and the carbon black is not more than any of the upper limits set forth above, the copolymer serving as a binder is not excessively covered by the conductive carbon fiber, and positive electrode peel strength can be ensured. On the other hand, when the proportion constituted by the conductive carbon fiber among the total amount of the conductive carbon fiber and the carbon black is at least the lower limit set forth above, a conduction path can favorably be formed in a positive electrode mixed material layer, and secondary battery output characteristics can be further improved.

<Other Components>

Besides the components described above, the slurry composition may have components such as binders other than the specific copolymer described above, reinforcing materials, leveling agents, viscosity modifiers, and additives for electrolyte solution contained in the binder composition. These other components may be commonly known examples thereof without any specific limitations, such as those described in WO 2012/115096 A1, for example. One of these components may be used individually, or two or more of these components may be used in combination in a freely selected ratio.

<Production of Slurry Composition>

The slurry composition set forth above can be produced by mixing the components described above. Specifically, the slurry composition can be produced by mixing the components using a mixer such as a ball mill, a sand mill, a bead mill, a pigment disperser, a grinding machine, an ultrasonic disperser, a homogenizer, a planetary mixer, or a FILMIX.

(Positive Electrode for Non-Aqueous Secondary Battery)

The presently disclosed positive electrode for a non-aqueous secondary battery includes a positive electrode mixed material layer that is formed on a current collector, for example, using the slurry composition for a non-aqueous secondary battery positive electrode set forth above. Specifically, the positive electrode mixed material layer is normally composed of a dried product of the slurry composition for a non-aqueous secondary battery positive electrode set forth above. The positive electrode mixed material layer contains at least a positive electrode active material and a copolymer, and may optionally contain a conductive material and other components. It should be noted that components contained in the positive electrode mixed material layer are components that are contained in the previously described slurry composition for a non-aqueous secondary battery positive electrode. Furthermore, the preferred ratio of these components in the positive electrode mixed material layer is the same as the preferred ratio of these components in the slurry composition.

As a result of the positive electrode mixed material layer in the presently disclosed positive electrode for a non-aqueous secondary battery being formed using the slurry composition for a non-aqueous secondary battery positive electrode set forth above, the presently disclosed positive electrode for a non-aqueous secondary battery can cause a secondary battery to display excellent output characteristics.

<Production of Positive Electrode for Non-Aqueous Secondary Battery>

The positive electrode mixed material layer of the presently disclosed positive electrode for a non-aqueous secondary battery can be formed on a current collector through a step of applying the slurry composition set forth above onto the current collector (application step) and a step of drying the slurry composition that has been applied onto the current collector to form the positive electrode mixed material layer on the current collector (drying step), for example.

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be appropriately set in accordance with the thickness of the positive electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. A current collector made of aluminum is preferable as the current collector of a positive electrode. One of these materials may be used individually, or two or more of these materials may be used in combination in a freely selected ratio.

[Drying Step]

The slurry composition on the current collector may be dried by a commonly known method without any specific limitations. Examples of drying methods that can be used include drying by warm, hot, or low-humidity air; drying in a vacuum; and drying by irradiation with infrared light, electron beams, or the like. Drying the slurry composition on the current collector in this manner forms a positive electrode mixed material layer on the current collector to yield a positive electrode for a non-aqueous secondary battery that includes the current collector and the positive electrode mixed material layer.

After the drying step, the positive electrode mixed material layer may be further subjected to pressing treatment such as mold pressing or roll pressing. This pressing treatment can improve peel strength of the positive electrode. Moreover, the peel strength of the positive electrode can be further improved while also further increasing the density of the positive electrode mixed material layer by performing heating to at least the glass-transition temperature of the copolymer in the pressing treatment. Furthermore, in a case in which the positive electrode mixed material layer contains a curable polymer, the polymer is preferably cured after formation of the positive electrode mixed material layer.

<Density of Positive Electrode Mixed Material Layer>

The density of the positive electrode mixed material layer included in the positive electrode obtained as set forth above is preferably 2.5 g/cm$^3$ or more, more preferably 2.8 g/cm$^3$ or more, and even more preferably 3.0 g/cm$^3$ or more, and is preferably 3.8 g/cm$^3$ or less, and more preferably 3.6 g/cm$^3$ or less. When the density of the positive electrode mixed material layer is not more than any of the upper limits set forth above, peel strength is not lost due to cracking of the positive electrode, and secondary battery cycle characteristics can be ensured. On the other hand, a positive electrode in which the density of the positive electrode mixed material layer is at least any of the lower limits set forth above has excellent peel strength.

(Non-Aqueous Secondary Battery)

The presently disclosed non-aqueous secondary battery includes a positive electrode, a negative electrode, an electrolyte solution, and a separator, wherein the presently disclosed positive electrode for a non-aqueous secondary battery is used as the positive electrode. The presently disclosed non-aqueous secondary battery has excellent battery characteristics such as output characteristics as a result of the presently disclosed positive electrode for a non-aqueous secondary battery being used as the positive electrode thereof.

Although the following describes, as one example, the negative electrode, the electrolyte solution, the separator, and a production method for a case in which the non-aqueous secondary battery is a lithium ion secondary battery, the presently disclosed non-aqueous secondary battery is not limited to the following example.

<Negative Electrode>

A known negative electrode can be used without any specific limitations as a negative electrode in the lithium ion secondary battery that is one example of the presently disclosed non-aqueous secondary battery. Specifically, the negative electrode may be a negative electrode that is obtained by forming a negative electrode mixed material layer on a current collector by a known production method.

<Electrolyte Solution>

The electrolyte solution is normally an organic electrolyte solution obtained by dissolving a supporting electrolyte in an organic solvent. The supporting electrolyte of the lithium ion secondary battery may be a lithium salt, for example. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution may be any organic solvent so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

The concentration of the electrolyte in the electrolyte solution may be adjusted as appropriate. Furthermore, known additives may be added to the electrolyte solution.

<Separator>

Examples of separators that can be used include, but are not specifically limited to, those described in JP 2012-204303 A. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the capacity per volume.

<Production Method of Lithium Ion Secondary Battery>

The lithium ion secondary battery according to this disclosure may be produced, for example, by stacking the positive electrode and the negative electrode with the separator in-between, performing rolling, folding, or the like of the resultant laminate as necessary in accordance with the battery shape to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to evaluate the proportion constituted by nickel among transition metal in a positive electrode active material, the weight-average molecular weight and molecular weight distribution of a copolymer, the stability of a slurry composition, the peel strength of a positive electrode, and the cycle characteristics and output characteristics of a lithium ion secondary battery.

<Proportion Constituted by Nickel Among Transition Metal in Positive Electrode Active Material>

A volumetric flask was charged with 15.0 mg of a positive electrode active material and wet decomposition of the positive electrode active material was carried out using sulfuric acid and nitric acid. Thereafter, ultrapure water was used to make up the volume to 50 mL and perform dilution as appropriate, and the proportion (mol %) constituted by nickel among transition metal (100 mol %) in the positive electrode active material was determined by ICP-AES.

The measurement conditions were as follows.

<<Measurement Conditions>>

Apparatus: SPS-5100 (product name) produced by SII NanoTechnology Inc.

Calibration curve: Internal standard calibration curve method

Measurement wavelength: Li 610.365 nm, Al 396.152 nm, Co 238.892 nm, Mn 257.610 nm, Ni 231.604 nm <Weight-Average Molecular Weight and Molecular Weight Distribution>

The weight-average molecular weight and number-average molecular weight of a copolymer were measured by GPC. First, the copolymer was added to approximately 5 mL of an eluent such that the solid content concentration of the copolymer was approximately 0.5 g/L, and the copolymer was slowly dissolved at room temperature. Once dissolution of the copolymer was visually confirmed, the resultant solution was gently filtered through a 0.45 μm filter to prepare a measurement sample. A standard substance was used to prepare a calibration curve such that the weight-average molecular weight and the number-average molecular weight were calculated as standard substance equivalent values. The molecular weight distribution was then calculated from the obtained weight-average molecular weight and number-average molecular weight.

The measurement conditions were as follows.

<<Measurement Conditions>>

Column: TSKgel SuperAWM-H (product name)×2 (6.0 mm I.D.×15 cm×2 columns) produced by Tosoh Corporation Eluent: Dimethylformamide (50 mM lithium bromide, 10 mM phosphoric acid)

Flow rate: 0.5 mL/min

Sample concentration: Approximately 0.5 g/L (solid content concentration)

Injection volume: 200 μL

Column temperature: 40° C.

Detector: Refractive index (RI) detector (HLC-8320 GPC RI (product name) produced by Tosoh Corporation)

Detector conditions: RI: Pol (+), Res (1.0 s)

Standard substance: Standard polystyrene kit (PStQuick Kit-H (product name) produced by Tosoh Corporation)

<Stability>

An obtained slurry composition was loaded into a tightly sealed vessel and was stored for 5 days while being stirred at a rotation speed of 60 rpm using a mix rotor. The pre-storage (straight after production) viscosity $\eta_0$ and the post-storage viscosity $\eta_1$ of the slurry composition were measured using a B-type viscometer (rotation speed: 60 rpm). Viscosity stability was calculated by the following formula and was evaluated by the standard shown below. A viscosity stability value closer to 100% indicates better slurry composition stability.

Viscosity stability=$(\eta_1/\eta_0) \times 100\%$

A: Viscosity stability of at least 100% and less than 120%
B: Viscosity stability of at least 120% and less than 160%
C: Viscosity stability of at least 160% and less than 200%
D: Viscosity stability of 200% or more <Peel Strength>

Aluminum foil of 20 μm in thickness was prepared as a current collector. A produced slurry composition for a positive electrode was applied onto one side of the aluminum foil such that the applied amount after drying was 20 mg/cm². The coating on the aluminum foil was dried for 20 minutes at 80° C. and for 20 minutes at 120° C., and then heat treatment was performed for 2 hours at 120° C. to obtain a positive electrode web. The positive electrode web was rolled using a roll press having a roll diameter of 300 mm under conditions of a load of 14 t and a pressing rate of 1,000 mm/min to prepare a sheet-shaped positive electrode including a positive electrode mixed material layer of 3.2 g/cm³ in density on the current collector.

A rectangle of 1.0 cm in width by 10 cm in length was cut out from the prepared sheet-shaped positive electrode for use as a specimen (positive electrode for evaluation). The specimen was secured to a test stage with the surface at the positive electrode mixed material layer side of the specimen facing upward. Next, cellophane tape (tape prescribed by JIS Z1522) was affixed to the surface at the positive electrode mixed material layer side of the specimen. The cellophane tape was subsequently peeled from one end of the specimen in a direction at 180° (i.e., toward the other end of the specimen) and at a speed of 50 mm/min, and the stress during this peeling was measured. This measurement was performed 10 times and an average value of the measurements was determined. The average value was taken to be the peel strength (N/m) and was evaluated by the following standard. A larger peel strength indicates better close adhesion strength between the positive electrode mixed material layer and the current collector.

A: Peel strength of 90 N/m or more
B: Peel strength of at least 70 N/m and less than 90 N/m
C: Peel strength of at least 50 N/m and less than 70 N/m
D: Peel strength of less than 50 N/m <Cycle Characteristics>

An operation of constant-voltage constant-current charging (4.2 V, 1 C) and constant-current discharging (3 V, 1 C) a produced lithium ion secondary battery was repeated 100 times (100 cycles) in a 45° C. environment. The discharge capacity at completion of 100 cycles as a percentage relative to the discharge capacity at completion of 1 cycle was taken to be the capacity maintenance rate ΔC (={(discharge capacity at completion of 100 cycles)/(discharge capacity at completion of 1 cycle)}×100%) and was evaluated by the following standard. A larger capacity maintenance rate ΔC indicates better high-voltage cycle characteristics.

A: Capacity maintenance rate ΔC of 90% or more
B: Capacity maintenance rate ΔC of at least 85% and less than 90%
C: Capacity maintenance rate ΔC of at least 80% and less than 85%
D: Capacity maintenance rate ΔC of less than 80%

<Output Characteristics>

A produced lithium ion secondary battery was subjected to a charge/discharge cycle of charging to 4.2 V by a 0.2 C constant current and discharging to 3.0 V by a 0.2 C constant current in an environment having a temperature of 25° C. and a charge/discharge cycle of charging to 4.2 V by a 0.2 C constant current and discharging to 3.0 V by a 1.0 C constant current in an environment having a temperature of 25° C. The discharge capacity at 1.0 C as a percentage relative to the discharge capacity at 0.2 C (=(Discharge capacity at 1.0 C)/(Discharge capacity at 0.2 C)×100%) was taken to be the capacity change rate ΔC' and was evaluated by the following standard. A larger capacity change rate ΔC' indicates better rate characteristics.

A: Capacity change rate ΔC' of 90% or more
B: Capacity change rate ΔC' of at least 85% and less than 90%
C: Capacity change rate ΔC' of at least 80% and less than 85%
D: Capacity change rate ΔC' of less than 80%

Example 1

<Production of Copolymer>

A reactor A having a mechanical stirrer and a condenser attached thereto was charged with 85 parts of deionized water and 0.2 parts of sodium dodecylbenzenesulfonate under a nitrogen atmosphere. The contents of the reactor A were subsequently heated to 55° C. under stirring and 0.3 parts of potassium persulfate in the form of a 5.0% aqueous solution was added into the reactor A. Next, a separate vessel B having a mechanical stirrer attached thereto was charged with 94.0 parts of acrylonitrile as a nitrile group-containing monomer, 1.0 parts of acrylamide as a basic group-containing monomer, 2.0 parts of acrylic acid as an acidic group-containing monomer, 3.0 parts of n-butyl acrylate as a (meth)acrylic acid ester monomer, 0.6 parts of sodium dodecylbenzenesulfonate, 0.035 parts of tertiary dodecyl mercaptan, 0.4 parts of polyoxyethylene lauryl ether, and 80 parts of deionized water under a nitrogen atmosphere. These materials were stirred and emulsified to prepare a monomer mixture. This monomer mixture was added into the reactor A at a constant rate over 5 hours while in a stirred and emulsified state. A reaction was carried out until the polymerization conversion rate reached 95% to yield a water dispersion of a copolymer. Next, NMP was added to the obtained water dispersion of the copolymer to adjust the solid content concentration of the copolymer to 7%. Vacuum distillation was then performed at 90° C. to remove water and excess NMP and thereby obtain an NMP solution of the copolymer (binder composition for a positive electrode having a solid content concentration of 6%). The weight-average molecular weight and molecular weight distribution of the obtained copolymer were measured. The results are shown in Table 1.

<Production of Slurry Composition for Positive Electrode>

A slurry composition for a positive electrode was produced by charging 95.0 parts of lithium nickel cobalt manganese oxide ($LiNi_{0.5}Co_{0.2}Mn_{0.3}O_2$) as a positive electrode active material, 2.0 parts of acetylene black (produced by Denki Kagaku Kogyo Kabushiki Kaisha; DENKA BLACK in powder form) and 0.5 parts of carbon nanotubes (multi-walled carbon nanotubes; CT-12 (product name) produced by Hodogaya Chemical Co., Ltd.; average fiber diameter: 105 nm) as conductive materials, 2.0 parts in terms of copolymer solid content of the NMP solution of the copolymer (binder composition for a positive electrode), and an appropriate amount of NMP as supplementary solvent to a planetary mixer and mixing these materials using the mixer. Note that the amount of supplementary NMP was adjusted so that the viscosity of the obtained slurry composition for a positive electrode at a temperature of 25° C. (value measured at 60 rpm using a "TVB-10" B-type viscometer produced by Toki Sangyo Co., Ltd.) was approximately 4,000 mPa·s.

The stability of the obtained slurry composition was evaluated. The obtained slurry composition was also used to prepare a specimen (positive electrode for evaluation) in order to evaluate positive electrode peel strength. The results are shown in Table 1.

<Production of Positive Electrode>

Aluminum foil of 20 μm in thickness was prepared as a current collector. The slurry composition for a positive electrode produced as described above was applied onto one side of the aluminum foil such that the applied amount after drying was 20 mg/cm². The coating on the aluminum foil was dried for 20 minutes at 80° C. and for 20 minutes at 120° C., and then heat treatment was performed for 2 hours at 120° C. to obtain a positive electrode web. The positive electrode web was rolled using a roll press having a roll diameter of 300 mm under conditions of a load of 14 t and a pressing rate of 1,000 mm/min to produce a sheet-shaped positive electrode including a positive electrode mixed material layer of 3.2 g/cm³ in density on a current collector. A 4.8 cm×5.0 cm rectangle was cut out from the sheet-shaped positive electrode for use as a positive electrode.

<Production of Negative Electrode>

A slurry composition for a negative electrode was produced by stirring 98 parts of spherical artificial graphite (volume-average particle diameter: 12 μm) as a negative electrode active material, 1 part of styrene-butadiene rubber (number-average particle diameter: 180 nm; glass-transition temperature: 10° C.) as a binder, 1 part of carboxymethyl cellulose as a thickener, and an appropriate amount of water using a planetary mixer.

Next, copper foil of 15 μm in thickness was prepared as a current collector. The slurry composition for a negative electrode produced as described above was applied onto one side of the copper foil such that the applied amount after drying was 12 mg/cm². The coating on the copper foil was dried for 20 minutes at 50° C. and for 20 minutes at 110° C., and then heat treatment was performed for 2 hours at 150° C. to obtain a negative electrode web. The negative electrode web was rolled by roll pressing to produce a sheet-shaped negative electrode including a negative electrode mixed material layer of 1.5 g/cm³ in density on the current collector. A 5.0 cm×5.2 cm rectangle was cut out from the sheet-shaped negative electrode for use as a negative electrode.

<Preparation of Separator>

A 5.4 cm×5.4 cm square was cut out from a single-layer polypropylene separator (width: 65 mm; length: 500 mm; thickness: 25 μm).

<Production of Lithium Ion Secondary Battery>

An aluminum packing case was prepared as a battery case. The positive electrode obtained as described above was positioned such that a surface at the current collector side of the positive electrode was in contact with the aluminum packing case. Next, the square separator obtained as described above was positioned on the positive electrode mixed material layer of the positive electrode. The negative electrode obtained as described above was positioned on the separator such that a surface at the negative electrode mixed material layer side of the negative electrode faced toward the separator. The aluminum packing case was filled with an electrolyte solution (mixed solution obtained through addition of 1.5% of vinylene carbonate (VC) as an additive to a LiPF$_6$ solution of 1.0 M in concentration (mixture of ethylene carbonate (EC) and ethyl methyl carbonate (EMC) (EC/EMC=3/7 (volume ratio)) used as solvent)). The aluminum packing case was then closed by heat sealing at 150° C. to tightly seal an opening of the aluminum packing case, and thereby obtain a lithium ion secondary battery.

Cycle characteristics and output characteristics of the obtained lithium ion secondary battery were evaluated. The results are shown in Table 1.

Examples 2 to 10

An NMP solution of a copolymer (binder composition for a positive electrode), a slurry composition for a positive electrode, a positive electrode, a negative electrode, and a lithium ion secondary battery were produced in the same way as in Example 1 with the exception that a monomer chemical composition indicated in Table 1 was adopted in production of the copolymer. Each evaluation was performed in the same way as in Example 1. The results are shown in Table 1.

Examples 11 and 12

An NMP solution of a copolymer (binder composition for a positive electrode), a slurry composition for a positive electrode, a positive electrode, a negative electrode, and a lithium ion secondary battery were produced in the same way as in Example 1 with the exception that the amount of tertiary dodecyl mercaptan used as a molecular weight modifier in production of the copolymer was changed to 0.08 parts (Example 11) or 0.06 parts (Example 12). Each evaluation was performed in the same way as in Example 1. The results are shown in Table 1.

Examples 13 and 14

An NMP solution of a copolymer (binder composition for a positive electrode), a slurry composition for a positive electrode, a positive electrode, a negative electrode, and a lithium ion secondary battery were produced in the same way as in Example 1 with the exception that LiNi$_{0.33}$Co$_{0.33}$Mn$_{0.33}$O$_2$ (Example 13) or LiNi$_{0.80}$Co$_{0.15}$Al$_{0.05}$O$_2$ (Example 14) was used as the positive electrode active material in production of the slurry composition for a positive electrode. Each evaluation was performed in the same way as in Example 1. The results are shown in Table 1.

Example 15

An NMP solution of a copolymer (binder composition for a positive electrode), a slurry composition for a positive electrode, a positive electrode, a negative electrode, and a lithium ion secondary battery were produced in the same way as in Example 1 with the exception that the roll clearance of the roll press in production of the positive electrode was adjusted and the pressing rate was changed to 500 mm/min such that the density of the positive electrode mixed material layer was 3.8 g/cm³. Each evaluation was performed in the same way as in Example 1. The results are shown in Table 1.

Comparative Example 1

An NMP solution of a copolymer (binder composition for a positive electrode), a slurry composition for a positive electrode, a positive electrode, a negative electrode, and a lithium ion secondary battery were produced in the same way as in Example 1 with the exception that $LiNi_{0.20}Co_{0.50}Mn_{0.30}O_2$ was used as the positive electrode active material in production of the slurry composition for a positive electrode. Each evaluation was performed in the same way as in Example 1. The results are shown in Table 1.

Comparative Examples 2 to 4

An NMP solution of a copolymer (binder composition for a positive electrode), a slurry composition for a positive electrode, a positive electrode, a negative electrode, and a lithium ion secondary battery were produced in the same way as in Example 1 with the exception that a monomer chemical composition indicated in Table 1 was adopted in production of the copolymer. Each evaluation was performed in the same way as in Example 1. The results are shown in Table 1.

In Table 1:
"AN" indicates acrylonitrile unit;
"AAm" indicates acrylamide unit;
"DEAam" indicates diethylacrylamide unit;
"MAam" indicates N-methylolacrylamide unit;
"AA" indicates acrylic acid unit;
"MAA" indicates methacrylic acid unit;
"IA" indicates itaconic acid unit;
"BA" indicates n-butyl acrylate unit;
"AcB" indicates acetylene black; and
"CNTs" indicates carbon nanotubes.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Slurry composition | Positive electrode active material | Proportion constituted by nickel among transition metal [mol %] | 50.0 | 50.0 | 50.0 | 50.0 | 50.0 | 50.0 | 50.0 | 50.0 | 50.0 | 50.0 |
| | | Amount [parts by mass] | 95 | 95 | 95 | 95 | 95 | 95 | 95 | 95 | 95 | 95 |
| | Copolymer | Chemical composition — Nitrile group-containing monomer unit — Type | AN | AN | AN | AN | AN | AN | AN | AN | AN | AN |
| | | Nitrile group-containing monomer unit — Percentage content [mass %] | 94.0 | 80.0 | 93.0 | 94.7 | 94.0 | 94.0 | 94.0 | 95.5 | 91.0 | 87.0 |
| | | Basic group-containing monomer unit — Type | AAm | AAm | AAm | AAm | DEAam | MAAm | AAm | AAm | AAm | AAm |
| | | Basic group-containing monomer unit — Percentage content [mass %] | 1.0 | 1.0 | 2.0 | 0.3 | 1.0 | 1.0 | 1.0 | 1.0 | 1.0 | 1.0 |
| | | Acidic group-containing monomer unit — Type | AA | AA | AA | AA | AA | AA | MAA | AA | IA | AA |
| | | Acidic group-containing monomer unit — Percentage content [mass %] | 2.0 | 2.0 | 2.0 | 2.0 | 2.0 | 2.0 | 2.0 | 0.5 | 5.0 | 2.0 |
| | | (Meth)acrylic acid ester monomer unit — Type | BA | BA | BA | BA | BA | BA | BA | BA | BA | BA |
| | | (Meth)acrylic acid ester monomer unit — Percentage content [mass %] | 3.0 | 17.0 | 3.0 | 3.0 | 3.0 | 3.0 | 3.0 | 3.0 | 3.0 | 10.0 |
| | | Weight-average molecular weight [—] | 120 × 10$^4$ | 120 × 10$^4$ | 120 × 10$^4$ | 120 × 10$^4$ | 120 × 10$^4$ | 120 × 10$^4$ | 120 × 10$^4$ | 120 × 10$^4$ | 120 × 10$^4$ | 120 × 10$^4$ |
| | | Molecular weight distribution [—] | 3.5 | 3.5 | 3.5 | 4.7 | 3.5 | 3.5 | 3.5 | 3.5 | 3.5 | 3.5 |
| | Conductive material | Amount of AcB + CNTs [parts by mass] | 2.5 | 2.5 | 2.5 | 2.5 | 2.5 | 2.5 | 2.5 | 2.5 | 2.5 | 2.5 |
| | | Amount of AcB [parts by mass] | 2 | 2 | 2 | 2 | 2 | 2 | 2 | 2 | 2 | 2 |
| | | Amount of CNTs [parts by mass] | 0.5 | 0.5 | 0.5 | 0.5 | 0.5 | 0.5 | 0.5 | 0.5 | 0.5 | 0.5 |
| | | Proportion constituted by CNTs among total amount of CNTs and AcB [mass %] | 20 | 20 | 20 | 20 | 20 | 20 | 20 | 20 | 20 | 20 |
| | Density of positive electrode mixed material layer [g/cm$^3$] | | 3.2 | 3.2 | 3.2 | 3.2 | 3.2 | 3.2 | 3.2 | 3.2 | 3.2 | 3.2 |
| Evaluation | Slurry composition stability | | A | A | A | B | B | B | A | A | A | A |
| | Peel strength | | A | B | B | B | B | B | A | C | B | B |
| | Cycle characteristics | | A | B | B | A | A | A | A | B | B | B |
| | Output characteristics | | A | C | A | A | A | A | A | A | C | C |

| | | | Example 11 | Example 12 | Example 13 | Example 14 | Example 15 | Comparative Example 1 | Comparative Example 2 | Comparative Example 3 | Comparative Example 4 |
|---|---|---|---|---|---|---|---|---|---|---|---|
| Slurry composition | Positive electrode active material | Proportion constituted by nickel among transition metal [mol %] | 50.0 | 50.0 | 33.3 | 84.2 | 50.0 | 20.0 | 50.0 | 50.0 | 50.0 |
| | | Amount [parts by mass] | 95 | 95 | 95 | 95 | 95 | 95 | 95 | 95 | 95 |
| | Copolymer | Chemical composition — Nitrile group-containing monomer unit — Type | AN | AN | AN | AN | AN | AN | AN | AN | AN |
| | | Percentage content [mass %] | 94.0 | 94.0 | 94.0 | 94.0 | 94.0 | 94.0 | 80.0 | 90.0 | 65.0 |

TABLE 1-continued

| | | | | | | | | | | |
|---|---|---|---|---|---|---|---|---|---|---|
| | Basic group-containing monomer unit | Type | AAm | AAm | AAm | AAm | AAm | AAm | AAm | AAm | — | AAm |
| | | Percentage content [mass %] | 1.0 | 1.0 | 1.0 | 1.0 | 1.0 | 1.0 | 6.0 | — | 1.0 |
| | Acidic group-containing monomer unit | Type | AA | AA | AA | AA | AA | AA | MAA | AA | AA |
| | | Percentage content [mass %] | 2.0 | 2.0 | 2.0 | 2.0 | 2.0 | 2.0 | 4.0 | 5.0 | 4.0 |
| | (Meth)acrylic acid ester monomer unit | Type | BA | BA | BA | BA | BA | BA | BA | BA | BA |
| | | Percentage content [mass %] | 3.0 | 3.0 | 3.0 | 3.0 | 3.0 | 3.0 | 10.0 | 5.0 | 30.0 |
| | Weight-average molecular weight [-] | | $20 \times 10^4$ | $70 \times 10^4$ | $120 \times 10^4$ | $120 \times 10^4$ | $120 \times 10^4$ | $120 \times 10^4$ | $120 \times 10^4$ | $120 \times 10^4$ | $120 \times 10^4$ |
| | Molecular weight distribution [-] | | 3.5 | 3.5 | 3.5 | 3.5 | 3.5 | 3.5 | 3.5 | 5.4 | 3.5 |
| Conductive material | Amount [parts by mass] | | 2 | 2 | 2 | 2 | 2 | 2 | 2 | 2 | 2 |
| | Amount of AcB + CNTs [parts by mass] | | 2.5 | 2.5 | 2.5 | 2.5 | 2.5 | 2.5 | 2.5 | 2.5 | 2.5 |
| | Amount of AcB [parts by mass] | | 2 | 2 | 2 | 2 | 2 | 2 | 2 | 2 | 2 |
| | Amount of CNTs [parts by mass] | | 0.5 | 0.5 | 0.5 | 0.5 | 0.5 | 0.5 | 0.5 | 0.5 | 0.5 |
| | Proportion constituted by CNTs among total amount of CNTs and AcB [mass %] | | 20 | 20 | 20 | 20 | 20 | 20 | 20 | 20 | 20 |
| Evaluation | Density of positive electrode mixed material layer [g/cm³] | | 3.2 | 3.2 | 3.2 | 3.2 | 3.8 | 3.2 | 3.2 | 3.2 | 3.2 |
| | Slurry composition stability | | A | A | A | A | A | A | A | D | A |
| | Peel strength | | C | B | A | A | C | A | D | B | D |
| | Cycle characteristics | | B | A | B | B | C | C | C | C | D |
| | Output characteristics | | A | A | A | A | A | D | D | B | D |

As shown in Table 1, the slurry compositions in Examples 1 to 15, which each contained a positive electrode active material in which the proportion constituted by nickel among transition metal was within a specific range and a copolymer including a nitrile group-containing monomer unit and a basic group-containing monomer unit with percentage contents within specific ranges, had excellent stability. Moreover, it was possible to obtain a positive electrode having excellent peel strength and produce a lithium ion secondary battery having excellent cycle characteristics and output characteristics using these slurry compositions.

It can also be seen from Table 1 that lithium ion secondary battery output characteristics deteriorated in Comparative Example 1 in which the used slurry composition contained a positive electrode active material in which the proportion constituted by nickel among transition metal was small.

Moreover, it can be seen from Table 1 that positive electrode peel strength and lithium ion secondary battery output characteristics deteriorated in Comparative Example 2 in which the used slurry composition contained a copolymer including a basic group-containing monomer unit with a high percentage content.

Furthermore, it can be seen from Table 1 that the slurry composition in Comparative Example 3, which contained a copolymer that did not include a basic group-containing monomer unit, had poor stability.

It can also be seen from Table 1 that positive electrode peel strength and lithium ion secondary battery cycle characteristics and output characteristics deteriorated in Comparative Example 4 in which the used slurry composition contained a copolymer including a nitrile group-containing monomer unit with a low percentage content.

INDUSTRIAL APPLICABILITY

According to the present disclosure, it is possible to provide a slurry composition for a non-aqueous secondary battery positive electrode that has excellent stability and enables formation of a positive electrode mixed material layer that causes a non-aqueous secondary battery to display excellent output characteristics.

Moreover, according to the present disclosure, it is possible to provide a positive electrode for a non-aqueous secondary battery that causes a non-aqueous secondary battery to display excellent output characteristics.

Furthermore, according to the present disclosure, it is possible to provide a non-aqueous secondary battery having excellent output characteristics.

The invention claimed is:

1. A slurry composition for a non-aqueous secondary battery positive electrode comprising a positive electrode active material and a copolymer, wherein
a proportion constituted by nickel among transition metal in the positive electrode active material is at least 30.0 mol % and not more than 100.0 mol %, and
the copolymer includes a nitrile group-containing monomer unit and an amide group-containing monomer unit, percentage content of the nitrile group-containing monomer unit in the copolymer when all repeating units in the copolymer are taken to be 100 mass % is at least 70.0 mass % and not more than 96.0 mass %, and percentage content of the amide group-containing monomer unit in the copolymer when all repeating units in the copolymer are taken to be 100 mass % is at least 0.1 mass % and not more than 5.0 mass %.

2. The slurry composition for a non-aqueous secondary battery positive electrode according to claim 1, wherein the copolymer further includes an acidic group-containing monomer unit, and percentage content of the acidic group-containing monomer unit in the copolymer when all repeating units in the copolymer are taken to be 100 mass % is at least 0.1 mass % and not more than 10.0 mass %.

3. The slurry composition for a non-aqueous secondary battery positive electrode according to claim 1, wherein the copolymer further includes a (meth)acrylic acid ester monomer unit, and percentage content of the (meth)acrylic acid ester monomer unit in the copolymer when all repeating units in the copolymer are taken to be 100 mass % is at least 1.0 mass % and not more than 20.0 mass %.

4. The slurry composition for a non-aqueous secondary battery positive electrode according to claim 1, wherein the positive electrode active material is a lithium-containing composite metal oxide represented by a formula (A1): $LiNi_aCo_bMn_cO_2$, where $0.3 \leq a \leq 1.0$, $0 \leq b \leq 0.5$, $0 \leq c \leq 0.5$, and $0.9 \leq a+b+c \leq 1.1$, or a formula (A2): $LiNi_xCo_yAl_zO_2$, where $0.7 \leq x \leq 1.0$, $0 \leq y \leq 0.3$, $0 \leq z \leq 0.1$, and $0.9 \leq x+y+z \leq 1.1$.

5. The slurry composition for a non-aqueous secondary battery positive electrode according to claim 1, further comprising a conductive material, wherein the conductive material includes conductive carbon fiber.

6. The slurry composition for a non-aqueous secondary battery positive electrode according to claim 1, wherein the copolymer has a weight-average molecular weight of at least 100,000 and not more than 1,500,000.

7. A positive electrode for a non-aqueous secondary battery comprising a positive electrode mixed material layer formed using the slurry composition for a non-aqueous secondary battery positive electrode according to claim 1.

8. The positive electrode for a non-aqueous secondary battery according to claim 7, wherein the positive electrode mixed material layer has a density of at least 2.5 g/cm$^3$ and not more than 3.8 g/cm$^3$.

9. A non-aqueous secondary battery comprising a positive electrode, a negative electrode, an electrolyte solution, and a separator, wherein the positive electrode is the positive electrode for a non-aqueous secondary battery according to claim 7.

* * * * *